United States Patent
Huang et al.

(10) Patent No.: US 8,493,341 B2
(45) Date of Patent: Jul. 23, 2013

(54) OPTICAL TOUCH DISPLAY DEVICE AND METHOD THEREOF

(75) Inventors: Yi-Ming Huang, Banchiao (TW); Ching-Chun Chiang, Tao Yuan Shien (TW); Yun-Cheng Liu, Banciao (TW); Chiou-Tzung Liou, Sanchong (TW); Ting-Hsuan Chang, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 1003 days.

(21) Appl. No.: 12/546,094

(22) Filed: Aug. 24, 2009

(65) Prior Publication Data

US 2010/0201639 A1 Aug. 12, 2010

(30) Foreign Application Priority Data

Feb. 10, 2009 (TW) .............................. 98104243 A (51) Int. Cl.
*G06F 3/041* (2006.01)
(52) U.S. Cl.
USPC ........................................................... 345/173
(58) Field of Classification Search
USPC .................. 345/173, 156, 143, 174, 175, 176
See application file for complete search history.

(56) References Cited

U.S. PATENT DOCUMENTS

| | | | |
|---|---|---|---|
| 6,421,042 B1 | 7/2002 | Omura et al. | |
| 6,492,633 B2 | 12/2002 | Nakazawa et al. | |
| 6,943,779 B2 * | 9/2005 | Satoh | 345/173 |
| 7,023,427 B2 * | 4/2006 | Kraus et al. | 345/173 |
| 7,053,887 B2 * | 5/2006 | Kraus et al. | 345/173 |
| 7,176,904 B2 * | 2/2007 | Satoh | 345/173 |
| 7,295,191 B2 * | 11/2007 | Kraus et al. | 345/173 |
| 7,880,720 B2 * | 2/2011 | Hill et al. | 345/156 |
| 8,062,115 B2 * | 11/2011 | Thomas et al. | 463/16 |
| 8,111,247 B2 * | 2/2012 | Thorn | 345/173 |
| 8,441,467 B2 * | 5/2013 | Han | 345/176 |
| 2006/0010400 A1 * | 1/2006 | Dehlin et al. | 715/856 |
| 2006/0200974 A1 | 9/2006 | Yoshida et al. | |
| 2009/0128508 A1 * | 5/2009 | Sohn et al. | 345/173 |
| 2009/0128516 A1 * | 5/2009 | Rimon et al. | 345/174 |
| 2009/0198359 A1 * | 8/2009 | Chaudhri | 700/94 |
| 2009/0262087 A1 * | 10/2009 | Kim | 345/173 |
| 2010/0149114 A1 * | 6/2010 | Li | 345/173 |
| 2010/0201812 A1 * | 8/2010 | McGibney et al. | 348/143 |
| 2010/0309138 A1 * | 12/2010 | Lee | 345/173 |

FOREIGN PATENT DOCUMENTS

TW 200832200 A 8/2008

OTHER PUBLICATIONS

English translation of abstract of TW 200832200 A.

* cited by examiner

*Primary Examiner* — Fred Tzeng
(74) *Attorney, Agent, or Firm* — McClure, Qualey & Rodack, LLP (57) ABSTRACT

The invention provides an optical touch display device. The optical touch display device comprises a display module, a first image capturing module, a second image capturing module and a processing module. The display module generates N touch points according to a touch gesture, the touch gesture has a specific moving model, and N is a positive integer. The first image capturing module retrieves a first image relating to N touch points. The second image capturing module retrieves a second image relating to N touch points. The processing module determines correspondingly a specific touch chord of N touch points according to the first image and the second image, and determines correspondingly a specific function of the touch gesture according to the specific touch chord and the specific moving mode.

20 Claims, 11 Drawing Sheets

OPTICAL TOUCH DISPLAY DEVICE AND METHOD THEREOF

CROSS-REFERENCE TO RELATED APPLICATION

This utility application claims priority to Taiwan Application Serial Number 098104243, filed Feb. 10, 2009, which is incorporated herein by reference.

BACKGROUND OF THE INVENTION

1. Field of the Invention

The present invention generally relates to a touch display apparatus, and more particularly, to the optical touch display device which can recognize the gesture to perform a multi-point touch inputting.

2. Description of the Prior Art

In recent years, with the vigorous development of image display technology, the touch panel has already become an important feature for an electronic product of the related companies because the touch panel has an interactive human machine interface (HMI) for users to input directly, for example, a point of sale (POS) terminal, a voting machine, a lottery machine, an industrial automation, a medical equipment, an office automation, a retail automation, a drugs manufacture automation, or a satellite navigational system of the vehicle. The integration of the monitor and the touch control technology of the electrical product can increase the value of the product; it is not only an interface providing output, but also a bi-directional integrated interface which can interact with the user and provide entertainment to the user.

In general, the optical touch monitor captures the image of user's gesture via the image capturing apparatus, and then uses the image processing technology and the gesture recognizing technology to achieve the inputting function. For example, if the user uses his/her finger to touch the monitor, the light will be shielded or blocked at certain position of the monitor by the finger, then the coordinate of the touch can be determined via the image processing technology to achieve the goal of inputting.

To sum up, the optical touch display device can provide the function of inputting directly, which becomes more convenient for users to operate it. However, in practical applications, the user always carelessly lays two or more fingers on the monitor, so the conventional image processing technology is unable to judge or even mis-operate. Therefore, the processing and the recognition of the image technology must be improved to make the optical touch monitor more humanized and further to provide the interactive inputting.

SUMMARY OF THE INVENTION

Accordingly, a scope of the present invention is to provide an optical touch display device using a multi-points touch technology and a specific touch gesture to generate a corresponding controlling to achieve the aim of control. In this way, the optical touch display device of the invention is more humanized to simplify the inputting operation to solve the problems in prior art.

According to an embodiment of the invention, the optical touch display device comprises a display module, a first image capturing module, a second image capturing module, and a processing module. The display module generates N touch points on the display module through a touch gesture, and the touch gesture has a specific moving mode, wherein N is a positive integer. The first image capturing module is used for capturing a first image related to the N touch points; the second image capturing module is used for capturing a second image related to the N touch points. The processing module is coupled to the display module, the first image capturing module, and the second image capturing module. The processing module is used for determining a specific touch chord corresponding to the N touch points according to the first image and the second image, and determining a specific action corresponding to the touch gesture according to the specific touch chord and the specific moving mode.

Another scope of the present invention is to provide a method of operating an optical touch display device using a multi-point touch technology and a specific touch gesture to generate a corresponding controlling to achieve the aim of control. In this way, the optical touch display device of the invention is more humanized to simplify the inputting operation to solve the problems in prior art.

According to an embodiment, the method of operating an optical touch display device comprising the following steps. Firstly, step (a) is performed to generate N touch points on the optical touch display device through a touch gesture, wherein N is a positive integer. Next, step (b) is performed to capture a first image and a second image related to the N touch points respectively. Then, step (c) is performed to determine a specific touch chord corresponding to the N touch points according to the first image and the second image. After that, step (d) is performed to determine a specific action corresponding to the touch gesture according to the specific touch chord and a specific moving mode of the touch gesture. Finally, step (e) is performed to perform the specific action.

To sum up, the optical touch display device and operating method thereof in the present invention use the multi-point touch technology and the specific touch gesture to generate the corresponding controlling method, and use the processing module to calculate the center position corresponding to all observation points to achieve the aim of control. In this way, the optical touch display device of the invention will be more humanized to simplify the inputting operation to solve the problems in prior art.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

FIG. 7A to FIG. 9D illustrate various embodiments of the invention performing touch recognition.

DETAILED DESCRIPTION OF THE INVENTION

Figure 1A:
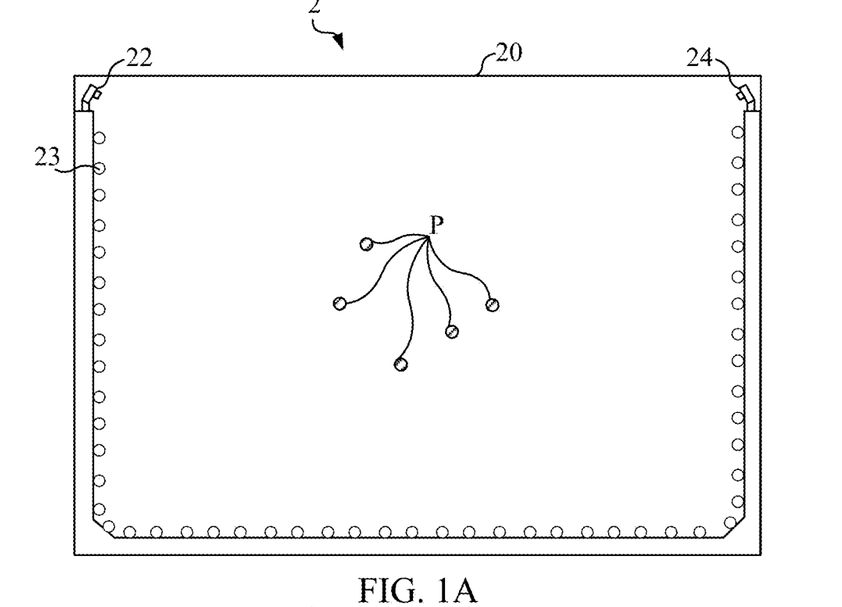
FIG. 1A illustrates a schematic diagram of the optical touch display device in an embodiment of the invention.

Please refer to FIG. 1A. FIG. 1A illustrates a schematic diagram of the optical touch display device 2 in an embodiment of the invention. The optical touch display device 2 includes a display module 20, a first image capturing module 22, a second image capturing module 24, and a plurality of lighting units 23. In fact, the optical touch display device 2 can also include a processing module (not shown in the figure). As shown in FIG. 1A, the optical touch display device 2 of the invention can be used to recognize a plurality of touch points P and perform a corresponding specific action or function. The plurality of lighting units 23, which are located around the display module 20, is used to generate light for the optical touch display device 2 to perform the touching recognition.

Figure 1B:
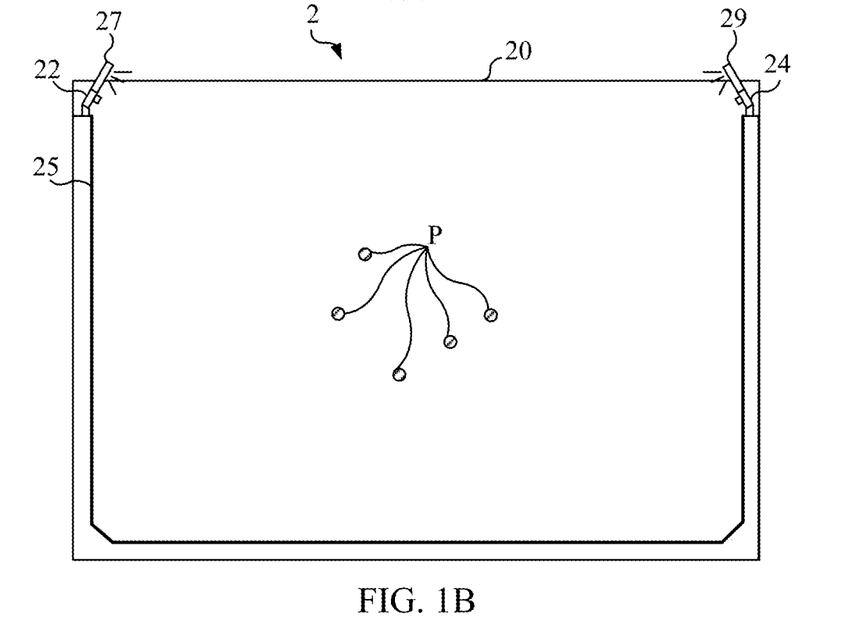
FIG. 1B illustrates another type of the optical touch display device.

FIG. 1B illustrates another type of the optical touch display device 2. As shown in FIG. 1B, the optical touch display device 2 includes not only a display module 20, a first image capturing module 22, and a second image capturing module 24, but also a reflective unit 25 or a reflection strip located around the display module 20 and a first lighting unit 27 and a second lighting unit 29 located near the first image capturing module 22 and the second image capturing module 24 respectively. Light is emitted from the first lighting unit 27 and the second lighting unit 29, and then reflected by the reflective unit 25 or the reflection strip to form a reflected light for the optical touch display device 2 to perform the touch recognition. In practical applications, the optical touch display device 2 has not only the above-mentioned two types, but also other types; it is not limited to this.

When a user touches the display module 20 via a touch gesture with N touch points, wherein N is a positive integer, the processing module of the optical touch display device 2 to judge a corresponding specific touch chord (the number of the fingers or the shielded points or observation points) and a specific moving mode or direction, and then determine and perform a specific action corresponding to the touch gesture. Afterward, the display module 20 will renew the shown frame.

In this embodiment, the first image capturing module 22 is used for capturing a first image related to the N touch points P on the monitor, and the second image capturing module 24 is used for capturing a second image related to the N touch points P on the monitor, wherein the first image capturing module 22 is located on a first position of the display module 20, the second image capturing module 24 is located on a second position, adjacent to the first position, of the display module 20. In this embodiment, the first position and the second position are located on the left upper corner and the right upper corner of the display module 20.

In this embodiment, the processing module of the optical touch display device 2 is coupled to the display module 20, the first image capturing module 22, and the second image capturing module 24. The processing module is used for determining a specific touch chord and a specific moving mode corresponding to the touch gesture with N touch points P according to the first image and the second image, and determining a controlling signal corresponding to the touch gesture according to the specific touch chord and the specific moving mode. The controlling signal is used for controlling the optical touch display device 2 to perform a corresponding specific action or function. Afterward, the display module 20 will renew the shown frame.

Figure 2:
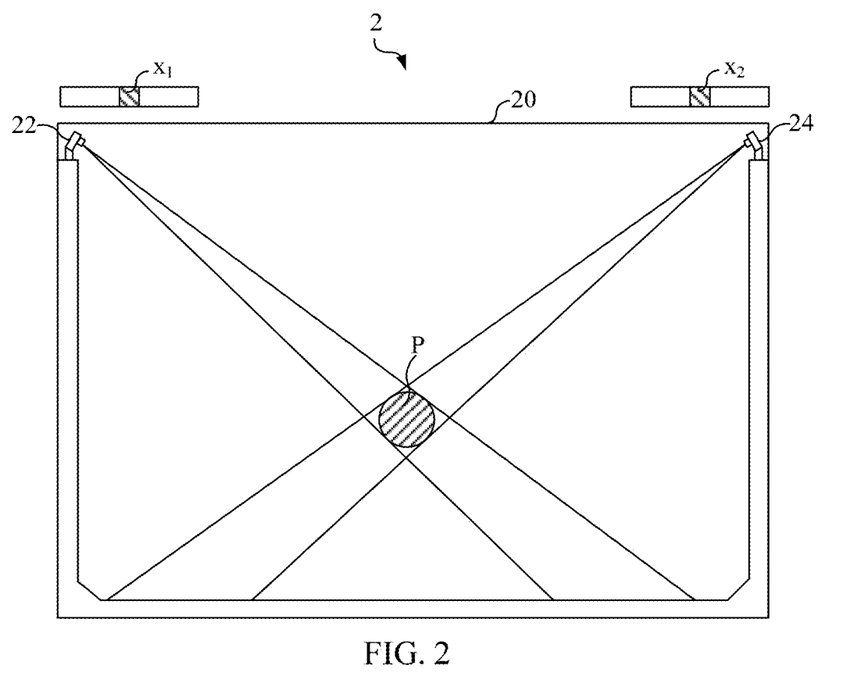
FIG. 2 illustrates a schematic diagram of the optical touch display device having a touch point.

The method of positioning the touch points P in the invention will be further explained on the basis of the corresponding images respectively captured by the first image capturing module 22 and the second image capturing module 24 as follows. Please refer to FIG. 2. FIG. 2 illustrates a schematic diagram of the optical touch display device 2 having a touch point P. As shown in FIG. 2, when an object unable of lighting exists on the display module 20 or a finger of the user touches the monitor, two or more image capturing modules observe and judge whether the light is shielded by the object or the finger, so that the position and the direction of the object or finger can be determined and confirmed.

In practical applications, the touch point P is observed by the first image capturing module 22 and the second image capturing module 24. When the light is shielded by the object, M1 first observation points and M2 second observation points are formed on the first image and the second image respectively. In fact, the light can be emitted from the plurality of lighting units located around the display module 20, or the light is generated from an light reflected by the reflective unit 25 or the reflection strip located around the display module 20.

The first image comprises M1 first observation points and the second image comprises M2 second observation points. The M1 first observation points and the M2 second observation points are both related to the N touch points P, wherein M1 and M2 are both positive integers. The processing module of the invention generates different combinations according to the number of the M1 and M2 observation points, and selects a corresponding specific touch chord from a plurality of pre-stored touch chords, and the processing module then performs the corresponding specific action and renews the shown frame according to the specific moving mode of the observation points. In practical applications, the touch chords can include single-point touch chord, dual-point touch chord, and multi-point touch chord (i.e., the touch chords other than the single-point touch chord or the dual-point touch chord).

Please refer to FIG. 2 again. As shown in FIG. 2, only one observation point is observed by the first image capturing module 22 and the second image capturing module 24; in this situation, M1=1 and M2=1, and the specific touch chord is defined single-point touch chord. The specific action corresponding to the single-point touch chord can be, for example, a continuing touch or click on an object or a controlling function of the system.

Next, the dual-point input by dual-points touch will be discussed as follows. Please refer to FIG. 3A, FIG. 3B, FIG. 3C, and FIG. 3D. FIG. 3A~FIG. 3D illustrates schematic diagrams of the optical touch display device 2 having two touch points ($P_1$ and $P_2$) respectively. Three specific touch chords will be shown in the figures according to the positions of the touch points $P_1$ and $P_2$.

Figure 3A:
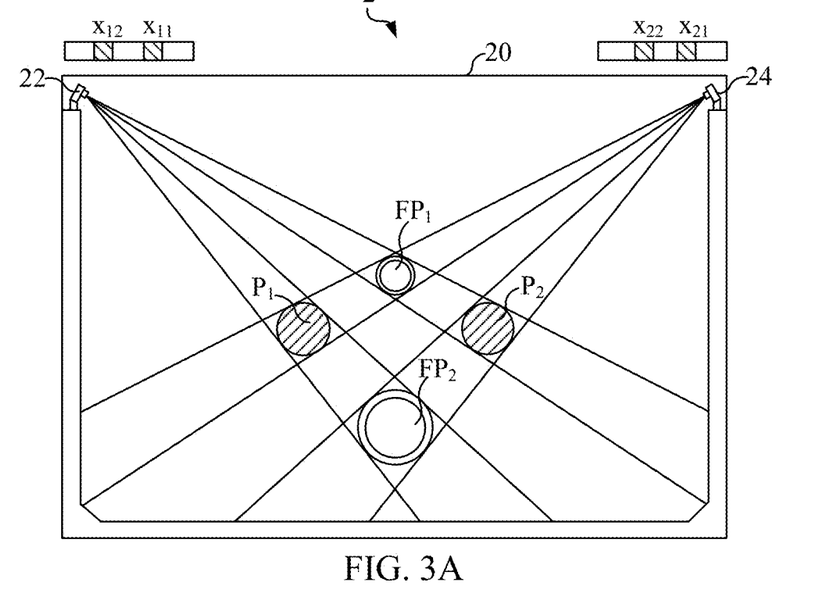
FIG. 3A to FIG. 3D illustrate schematic diagrams of the optical touch display device having two touch points respectively.
Figure 3B:
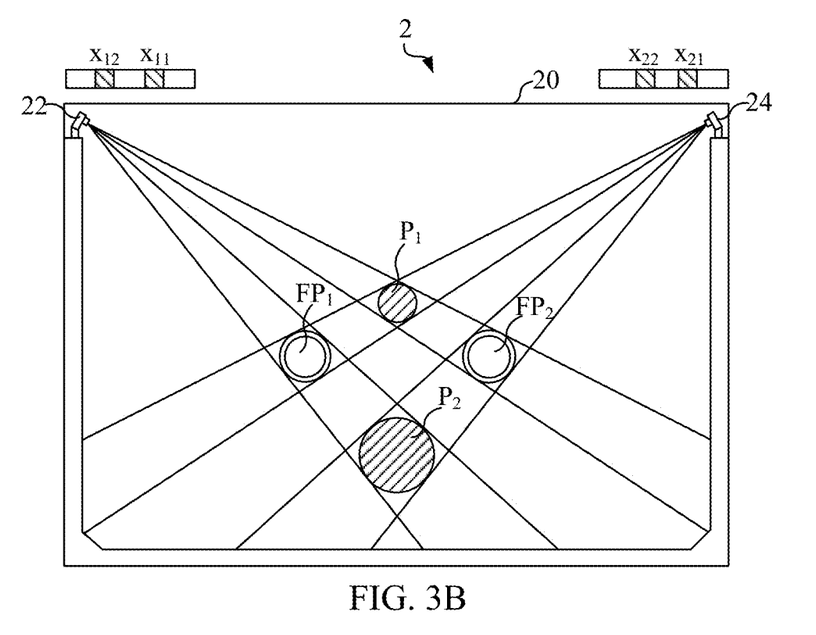

As shown in FIG. 3A and FIG. 3B, two touch points ($P_1$ and $P_2$) are upper-lower arranged or left-right arranged, the first image and the second image can be obtained through the first image capturing module 22 and the second image capturing module 24, wherein, the number of observation points in the first image M1 equals 2 and the number of observation points in the second image M2 equals 2. In this condition, the specific touch chord is defined first dual-point touch chord. As shown in the figure, the positions of the two observation points shown on the first image are $x_{11}$ and $x_{12}$ respectively, so the center of the observation points in the first image is $(x_{11}+x_{12})/2$. Similarly, the positions of the two observation points shown on the second image are $x_{21}$ and $x_{22}$ respectively, so the center of the observation points in the second image is $(x_{21}+x_{22})/2$.

Figure 3C:
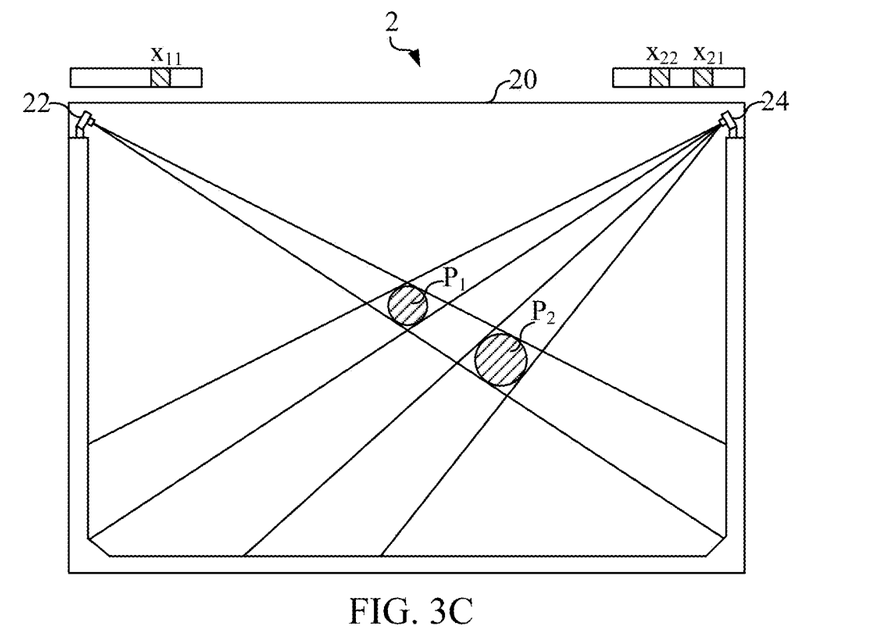
Figure 3D:
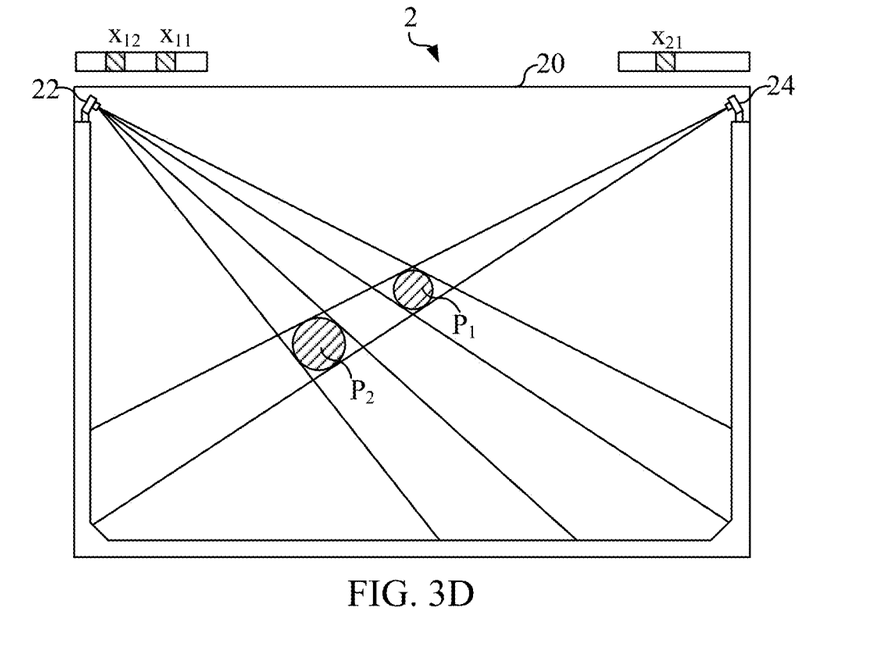

As shown in FIG. 3C, when M1=1 and M2=2, the specific touch chord is defined second dual-point touch chord, and the center of the observation point in the first image is $x_{11}$; the center of the observation points in the second image is $(x_{21}+x_{22})/2$. As shown in FIG. 3D, when M1=2 and M2=1, the specific touch chord is defined third dual-point touch chord, and the center of the observation points in the first image is $(x_{11}+x_{12})/2$; the center of the observation point of the second image is $x_{21}$.

Figure 4A:
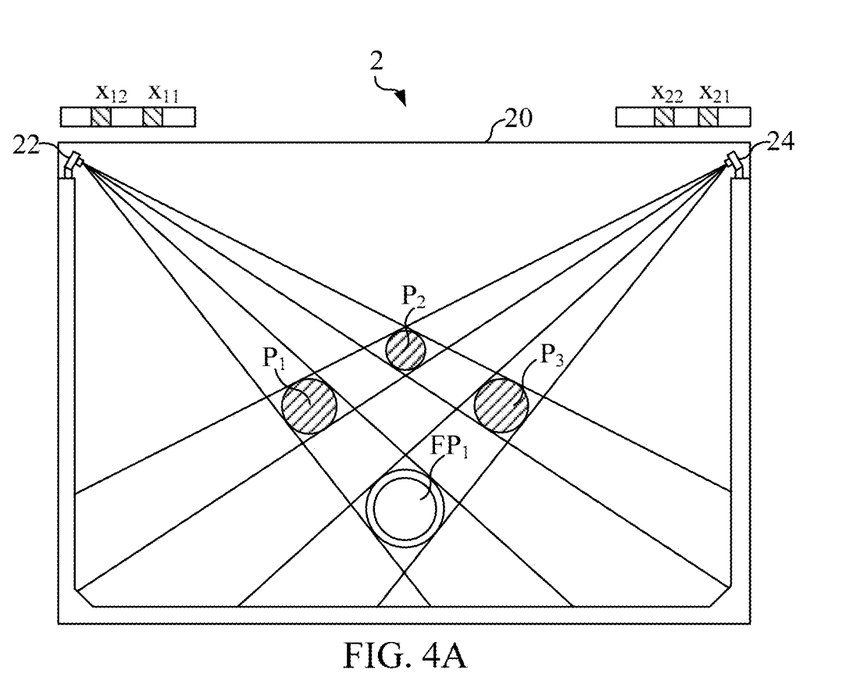
FIG. 4A illustrates a schematic diagram of the optical touch display device having three touch points.
Figure 4B:
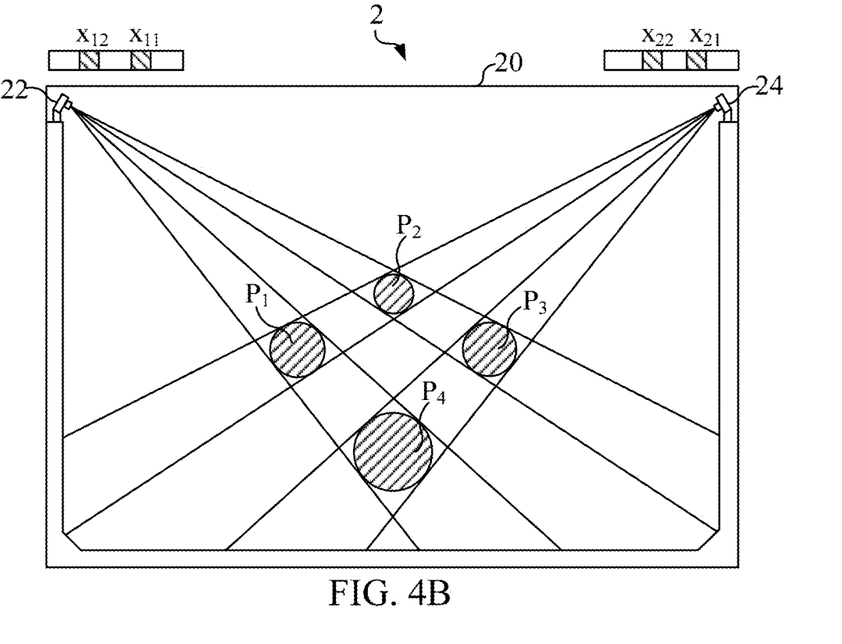
FIG. 4B illustrates a schematic diagram of the optical touch display device having four touch points.

Please refer to FIG. 4A and FIG. 4B. FIG. 4A illustrates a schematic diagram of the optical touch display device 2 having three touch points ($P_1$, $P_2$, and $P_3$). As shown in FIG. 4A, the center of the observation points in the first image and the second image are $(x_{11}+x_{12})/2$ and $(x_{21}+x_{22})/2$ respectively according to the observation positions of the three touch points ($P_1$, $P_2$ and $P_3$) observed by the first image capturing module 22 and the second image capturing module 24. FIG. 4B illustrates a schematic diagram of the optical touch display device 2 having four touch points. As shown in FIG. 4B, two touch point positions are overlapped through the observation of the first image capturing module 22 and the second image capturing module 24 respectively, so that the number of observation points is two. Accordingly, the center positions of the observation points in the first image and the second image are $(x_{11}+x_{12})/2$ and $(x_{21}+x_{22})/2$ respectively.

Furthermore, when the user uses three-point or four-point touch, the image capturing modules may observe two observation point positions respectively. Compare to the dual-point touch, the difference is that three point touch or the four point touch have three or four real touch points respectively. As the touch points shown in FIG. 4A and FIG. 4B, only in a special condition, this overlapping happens.

Because M1=2 and M2=2 in FIG. 4A and FIG. 4B, FIG. 4A and FIG. 4B match the feature of the first dual-point touch chord. Thus, under this special condition of touching positions (although the three to four real touch points are shown), and it is still considered as dual-point touch chord (the first dual-point touch chord).

Figure 5:
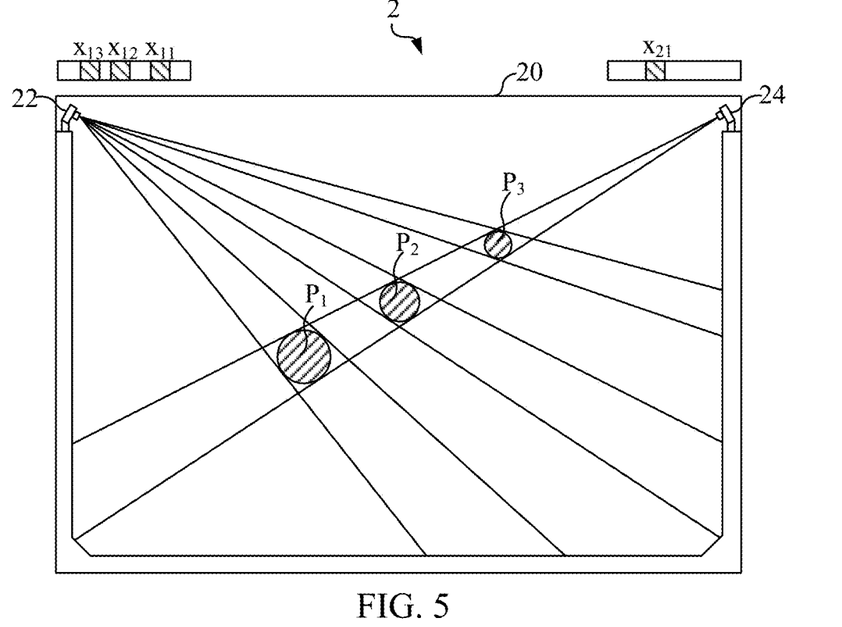
FIG. 5 illustrates a schematic diagram of the optical touch display device having three touch points.
Figure 6:
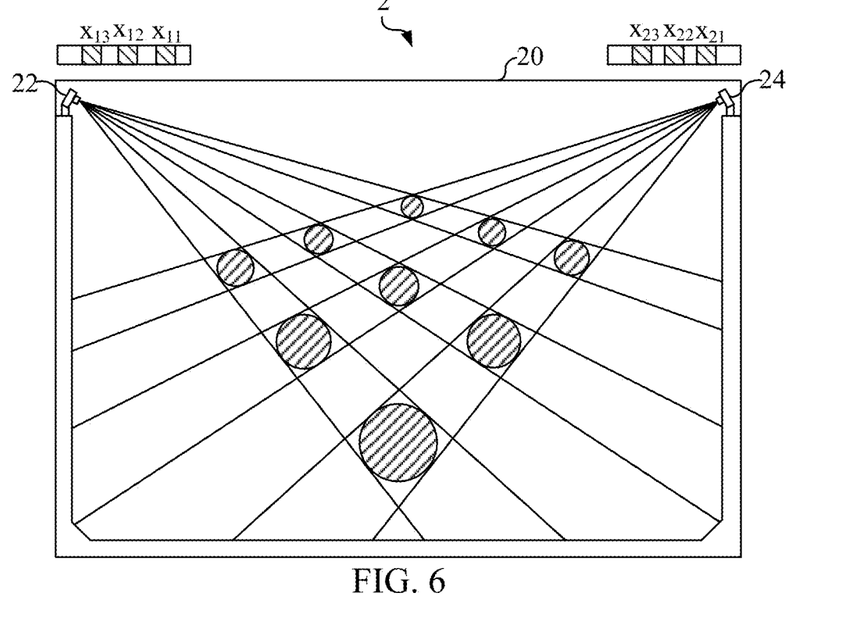
FIG. 6 illustrates a schematic diagram of the optical touch display device having a plurality of touch points.

If a touch chord is judged as neither single-point touch chord nor dual-point touch chord by the processing module, the touch chord will be classified to a multi-point touch chord. There are various multi-point touch chords, and two examples of multi-point touch chords are shown as follows. Please refer to FIG. 5 and FIG. 6. FIG. 5 illustrates a schematic diagram of the optical touch display device 2 having three touch points ($P_1$, $P_2$ and $P_3$), and FIG. 6 illustrates a schematic diagram of the optical touch display device 2 having a plurality of touch points. Because this type of touch chord does not satisfy the features of the single-point touch and the dual-point touch, this type of touch chord is judged as the multi-point touch chord. In order to save calculating resource, the invention directly uses all positions of the observation points to calculate the center position (i.e., the center positions of the observation points) to judge and determine the touch gestures. In FIG. 5, the center positions of the observation points in the first image and the second image are $(x_{11}+x_{12}+x_{13})/3$ and $x_{21}$ respectively according to the observation positions formed by the three touch points ($P_1$, $P_2$, and $P_3$) observed by the first image capturing module 22 and the second image capturing module 24. In FIG. 6, the center positions of the observation points in the first image and the second image are $(x_{11}+x_{12}+x_{13})/3$ and $(x_{21}+x_{22}+x_{23})/3$ respectively according to the observation positions formed by the plurality of touch points observed by the first image capturing module 22 and the second image capturing module 24.

In this embodiment, specific moving mode relates to the movement of the M1 first observation points and the M2 second observation points accompanying the touch gesture. Next, several examples of using the invention to perform the touch recognition will be introduced as follows. It should be noticed that the relationships between the various specific actions and display functions of the monitor and the specific touch chords and the specific moving modes of the touch gesture are not fixed. There are still other possibilities. So, it is not limited to these cases.

Figure 7A:
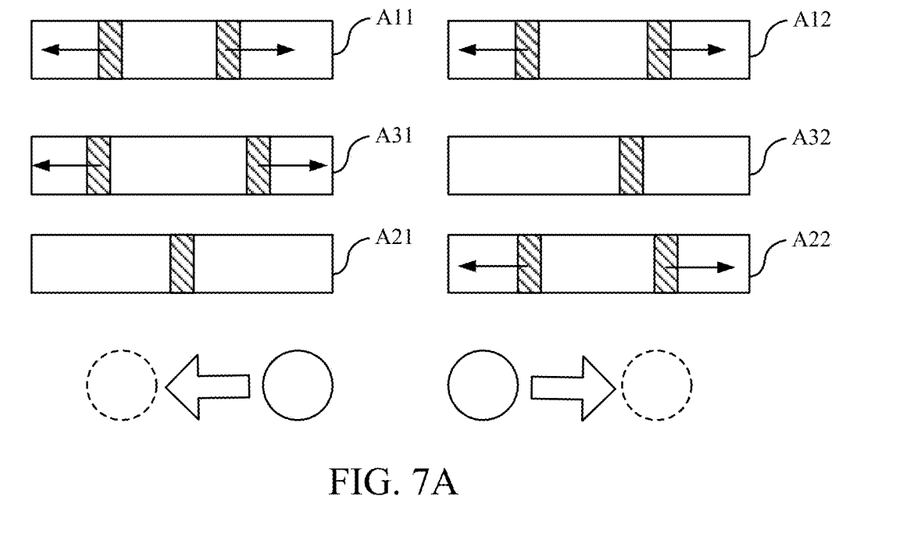
Figure 7B:
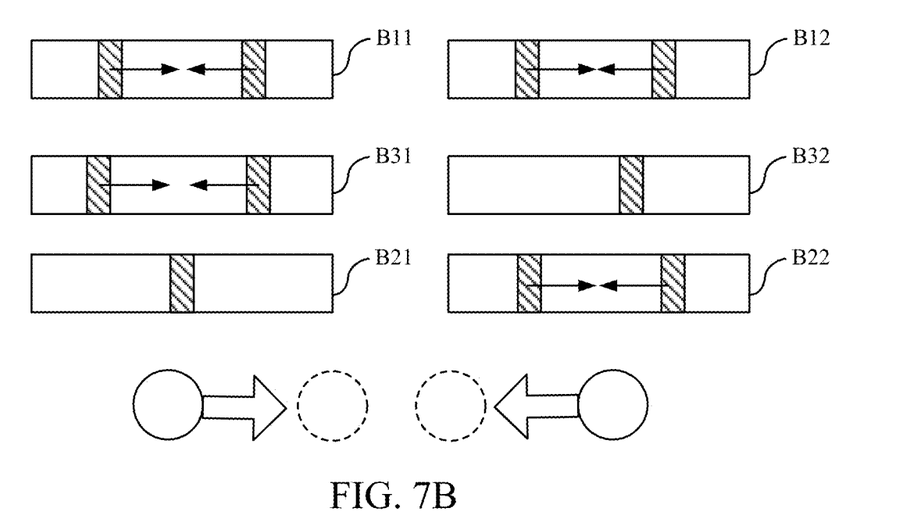

Please refer to FIG. 7A and FIG. 7B, the solid-line circle represents the position before moving, the dotted-line circle represents the position after moving, and the arrow represents the moving mode (or direction), wherein the first image A11, B11 and the second image A12, B12 correspond to FIG. 3A, FIG. 3B, FIG. 4A, or FIG. 4B; namely, the number of observation points in the first image M1 is 2 and the number of observation points in the second image M2 is 2; the first image A21, B21 and the second image A22, B22 correspond to FIG. 3C; the number of observation points in the first image M1 is 1 and the number of observation points in the second image M2 is 2; the first image A31, B31 and the second image A32, B32 correspond to FIG. 3D; and the number of observation points in the first image M1 is 2 and the number of observation points in the second image M2 is 1. As shown in FIG. 7A, two observation points on the first image and the second image are departed from each other in opposite directions; namely, the two touch points depart from each other in opposite directions. In this embodiment, the specific action and the display function corresponding to this state is zoom-in function, but not limited to this; on the contrary, as shown in FIG. 7B, two observation points on the first image and the second image move close to each other; namely, the two touch points are getting close to each other. In this embodiment, the specific action and the display function corresponding to this state is zoom-out function, but not limited to this.

Furthermore, the specific moving mode relates to the movement of a first center position of the M1 first observation points and a second center position of the M2 second observation points accompanying the touch gesture of the user. The center position comprises the first center position generated by averaging positions of the M1 first observation points and the second center position generated by averaging positions of the M2 second observation points. If the number of the first observation point or the second observation point is one (as shown in FIG. 3C or FIG. 3D), the position of the only one observation point is directly regarded as the center position.

Please refer to FIG. 8A, FIG. 8B, FIG. 8C, and FIG. 8D together, the solid-line circle represents the position before moving, the dotted-line circle represents the position after moving, the arrow represents the moving mode (or direction), the schematic diagram is correspondingly judged as the dual-point touch chord (FIG. 3A~FIG. 4B). In the situation of dual-point touch chord, assuming that the center position of the two observation points in the first image is $x_{1c}$ and the center position of the two observation points in the second image is $x_{2c}$, if $x_{1c}$ moves towards right and $x_{2c}$ moves towards left, it means that both of the two touch points move upward. In this embodiment, the specific action corresponding to this state is "upward scrolling", but not limited to this.

Figure 8A:
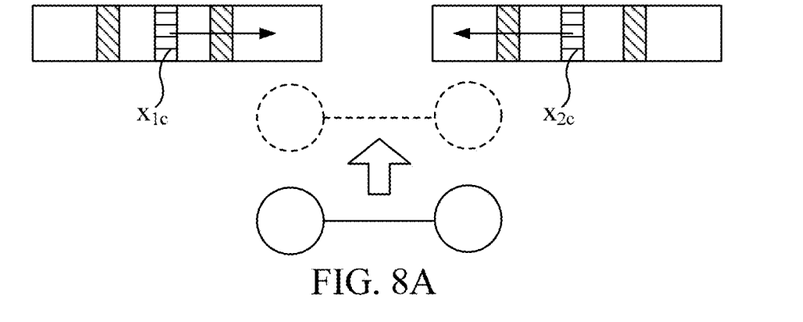
Figure 8B:
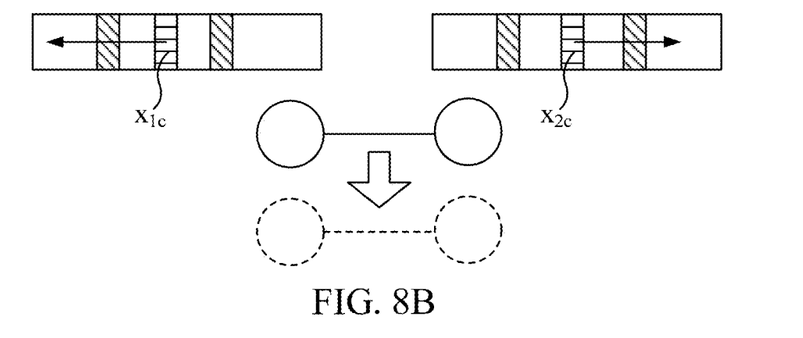

Otherwise, as shown in FIG. 8B, if $x_{1c}$ moves towards left and $x_{2c}$ moves towards right, it means that both of the two touch points move downward. In this embodiment, the specific action corresponding to this state is "downward scrolling", but not limited to this. In practical applications, this function is the same with the function of moving a window frame upward or downward to read or search any objects or data.

Figure 8C:
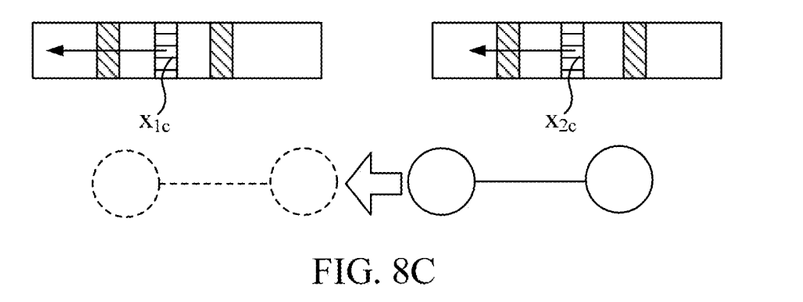
Figure 8D:
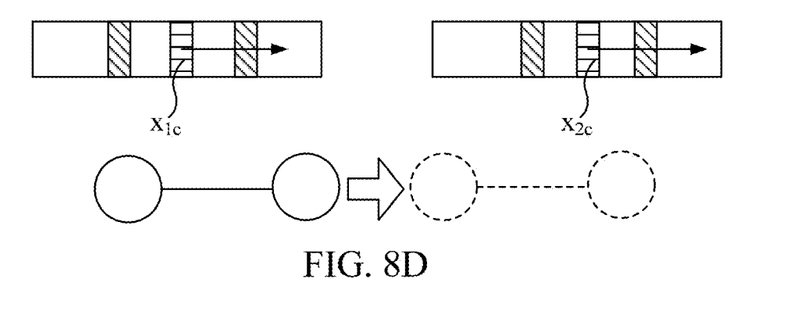

Additionally, as shown in FIG. 8C and FIG. 8D, if $x_{1c}$ and $x_{2c}$ move towards left or right at the same time, it means that both of the two touch points move towards left or right. In this embodiment, the specific actions corresponding to these two states are "left scrolling" or "right scrolling" respectively, but not limited to this.

Figure 9A:
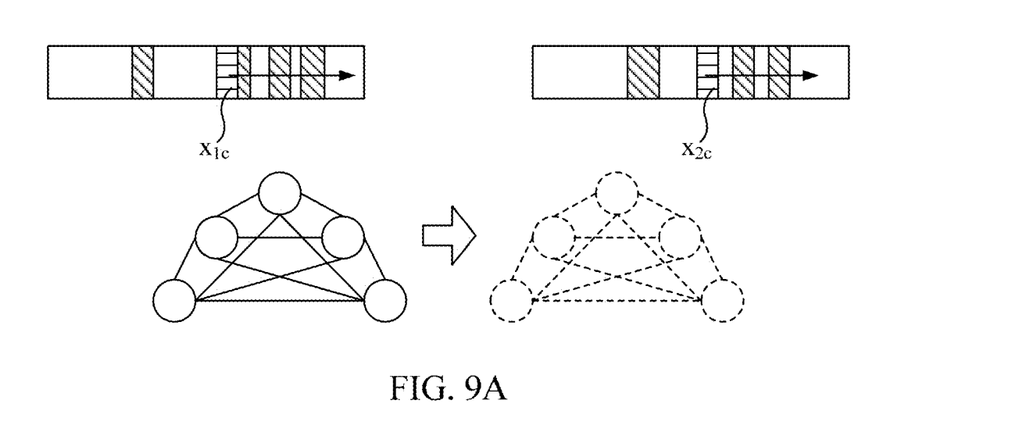
Figure 9B:
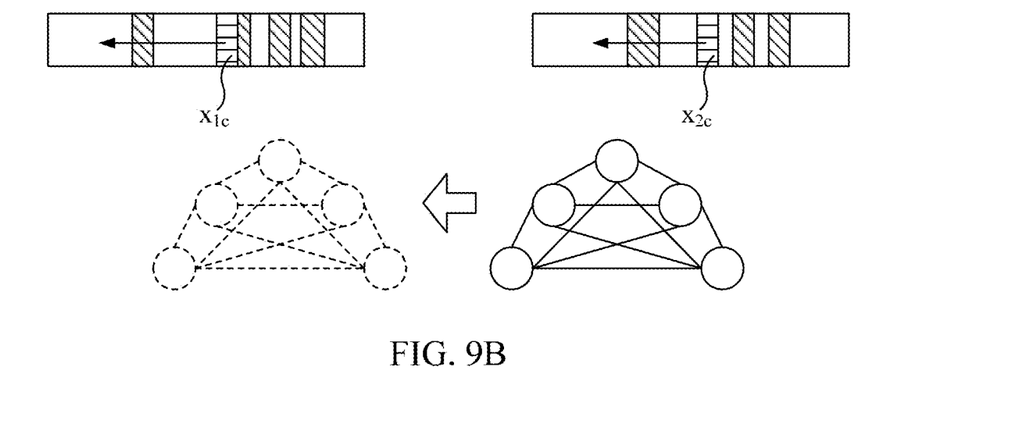

Furthermore, please refer to FIG. 9A, FIG. 9B, FIG. 9C, and FIG. 9D. The solid-line circle represents the position before moving, the dotted-line circle represents the position after moving, the arrow represents the moving mode (or direction). FIG. 9A~FIG. 9D illustrate a schematic diagram of five fingers of the user touching the display module 20. In the situation of multi-point touch chord, assuming that the center position of all observation points in the first image is $x_{1c}$ and the center position of all observation points in the second image is $x_{2c}$, if both of $x_{1c}$ and $x_{2c}$ move towards right, it means that all of the touch points move towards right. In this embodiment, the specific action corresponding to this state is "next page", but not limited to this. Otherwise, as shown in FIG. 9B, if both of $x_{1c}$ and $x_{2c}$ move towards left, it means that all of the touch points move towards the left. In this embodiment, the specific action corresponding to this state is "previous page", but not limited to this.

Figure 9C:
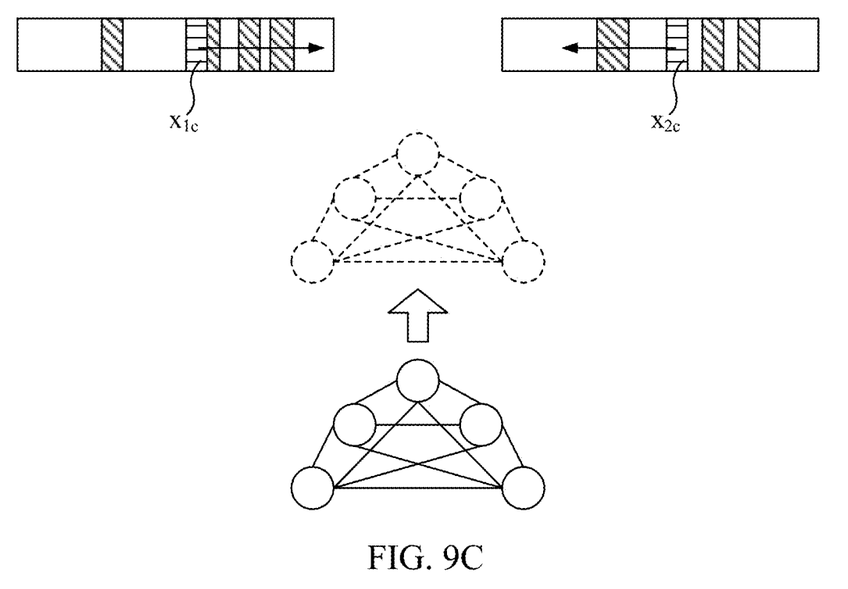
Figure 9D:
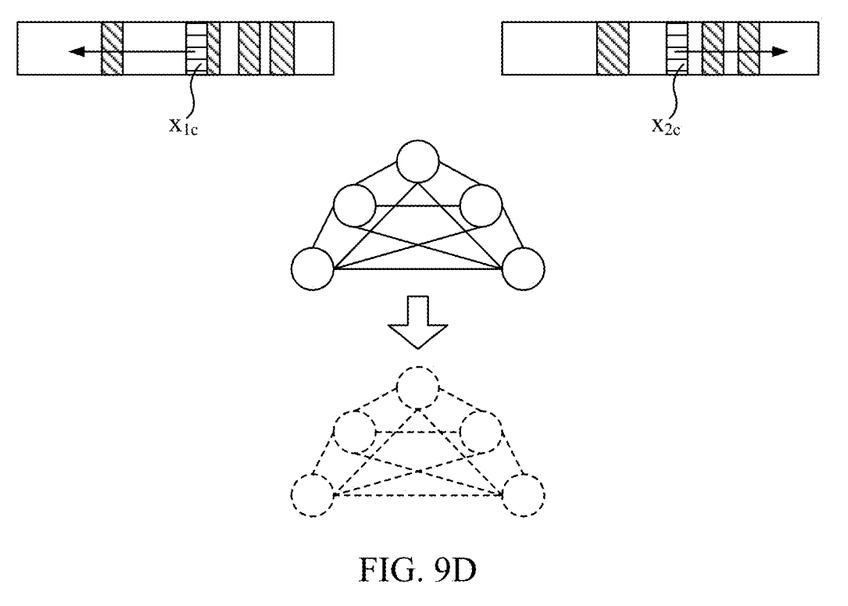

As shown in FIG. 9C, if $x_{1c}$ moves towards right and $x_{2c}$ moves towards left, the specific action corresponding to this state is "previous label", but not limited to this. Otherwise, as shown in FIG. 9D, if $x_{1c}$ moves towards left and $x_{2c}$ moves towards right, the specific action corresponding to this state is "next label", but not limited to this.

More default specific actions can be increased by the user if necessary (i.e. user-defined), and the corresponding relationship between various touch gestures and specific actions can be randomly set to satisfy the needs of the user.

Figure 10:
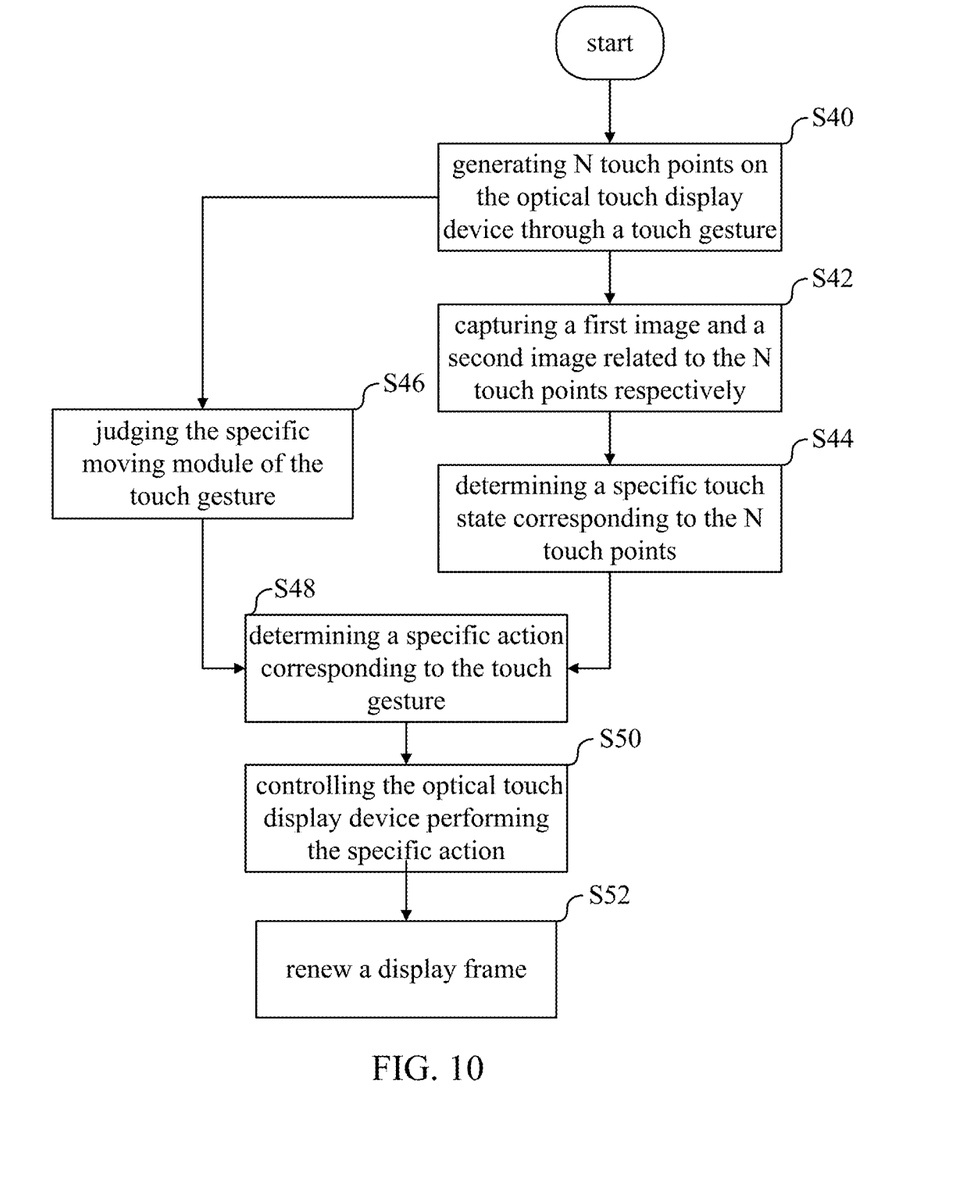
FIG. 10 illustrates a flow chart of the method of operating an optical touch display device in another embodiment of the invention.

Please refer to FIG. 10. FIG. 10 illustrates a flow chart of the method of operating an optical touch display device in another embodiment of the invention. With this method, the user can input via touching, and operate the optical touch display device by changing his/her touch gestures. In this embodiment, this operating method includes the following steps.

Firstly, step S40 is performed that the optical touch display device generates N touch points through a touch gesture of the user, and N is a positive integer. In practical applications, the user places his/her finger on the display module, and then step S42 is performed to observe and capture a first image and a second image, wherein the first image comprises M1 first observation points and the second image comprises M2 second observation points, the M1 first observation points and the M2 second observation points are both related to the N touch points, and M1 and M2 are both positive integers.

Next, step S44 is performed, the optical touch display device determines a specific touch chord corresponding to the N touch points according to the first image and the second image. The specific touch chord is selected from a plurality of pre-stored touch chords according to the different combinations of M1 and M2.

Furthermore, when M1=1 and M2=1, the specific touch chord is judged as single-point touch chord. It means that the optical touch display device has single finger or touch and the optical touch display device performs a specific action or function corresponding to the single-point touch chord such as "click" function.

If the user uses his/her two fingers to touch the optical touch display device, the following three specific conditions will be generated. (1) When M1=2 and M2=2, the specific touch chord is judged as first dual-point touch chord; (2) when M1=1 and M2=2, the specific touch chord is judged as second dual-point touch chord; (3) when M1=2 and M2=1, the specific touch chord is judged as third dual-point touch chord.

Furthermore, when M1>2 and/or M2>2, the specific touch chord is judged as multi-point touch chord.

Additionally, after step S40 is performed, step S46 is performed to judge the specific moving mode of the touch gesture.

Then, step S48 is performed to determine a specific action corresponding to the touch gesture according to the specific touch chord and the specific moving mode of the touch gesture. In fact, the specific moving mode relates to the movement of the M1 first observation points and the M2 second observation points accompanying the touch gesture.

It should be noticed that the specific moving mode relates to the movement of a first center position of the M1 first observation points and the movement of a second center position of the M2 second observation points accompanying the touch gesture, wherein the first center position is a position average value of the M1 first observation points and the second center position is a position average value of the M2 second observation points.

Afterward, step S50 is performed to control the optical touch display device 2 to perform the specific action. In fact, the specific action can be a default specific action of zoom-in, zoom-out, upward scrolling, downward scrolling, left scrolling, right scrolling, previous page, next page, previous label, or next label, but not limited to these actions. At last, step S52 is performed to renew a display frame on the display module 20.

To sum up, the optical touch display device and the operating method thereof can use the multi-points touch technology and the specific touch gesture corresponding to the controlling method, and the center position corresponding to all touch points are calculated by the processing module to reach the controlling goal. Additionally, in the situation of multi-point touch, the invention directly uses all position of the observation points to calculate the center position to judge and determine the touch gesture, and it dose not waste the calculating resource to calculate the real touch points. In this way, the optical touch display device of the invention will be more humanized to simplify the inputting operation to solve the problems in prior art.

Although the present invention has been illustrated and described with reference to the preferred embodiment thereof, it should be understood that it is in no way limited to the details of such embodiment but is capable of numerous modifications within the scope of the appended claims.

What is claimed is:
1. An optical touch display device, comprising:
a display module, N touch points being generated on the display module through a touch gesture at a same time, the touch gesture having a specific moving mode, N being a positive integer;
a first image capturing module, for capturing a first image related to the N touch points;
a second image capturing module, for capturing a second image related to the N touch points; and
a processing module, coupled to the display module, the first image capturing module, and the second image capturing module, for determining a specific touch chord corresponding to the N touch points according to the first image and the second image, and determining a specific action corresponding to the touch gesture according to the specific touch chord and the specific moving mode.

2. The optical touch display device of claim 1, wherein the first image capturing module is located on a first position of the display module, the second image capturing module is located on a second position of the display module, and the first position is adjacent to the second position.

3. The optical touch display device of claim 1, wherein the first image comprises M1 first observation points and the second image comprises M2 second observation points, the M1 first observation points and the M2 second observation points are both related to the N touch points, and M1 and M2 are both positive integers.

4. The optical touch display device of claim 3, wherein the processing module selects the specific touch chord correspondingly from a plurality of pre-stored touch chords according to combinations of M1 and M2.

5. The optical touch display device of claim 3, wherein when M1=1 and M2=1, the specific touch chord is defined single-point touch chord.

6. The optical touch display device of claim 3, wherein when M1=2 and M2=2, the specific touch chord is defined first dual-point touch chord; when M1=1 and M2=2, the specific touch chord is defined second dual-point touch chord; when M1=2 and M2=1, the specific touch chord is defined third dual-point touch chord.

7. The optical touch display device of claim 3, wherein when M1>2 or M2>2, the specific touch chord is a multi-point touch chord.

8. The optical touch display device of claim 3, wherein the M1 first observation points and the M2 second observation points formed on the first image and the second image respectively is caused by an object shielding light.

9. The optical touch display device of claim 8, wherein the light is emitted from a lighting unit located around the display module, or reflected by a reflective unit located around the display module.

10. The optical touch display device of claim 3, wherein the specific moving mode is related to a movement of a first center position of the M1 first observation points and a second center position of the M2 second observation points, the first center position is a position average value of the M1 first observation points and the second center position is a position average value of the M2 second observation points.

11. The optical touch display device of claim 1, wherein the specific action is selected from the group of: zoom-in, zoom-out, upward scrolling, downward scrolling, left scrolling, right scrolling, previous page, next page, previous label, and next label.

12. A method of operating an optical touch display device, the method comprising the steps of:
(a) generating N touch points on the optical touch display device through a touch gesture at a same time, N being a positive integer;
(b) capturing a first image and a second image related to the N touch points respectively;
(c) determining a specific touch chord corresponding to the N touch points according to the first image and the second image;
(d) determining a specific action corresponding to the touch gesture according to the specific touch chord and a specific moving mode of the touch gesture; and
(e) performing the specific action.

13. The method of claim 12, wherein the first image comprises M1 first observation points and the second image comprises M2 second observation points, the M1 first observation points and the M2 second observation points are both related to the N touch points, and M1 and M2 are both a positive integers.

14. The method of claim 13, wherein in step (c), the specific touch chord is selected from a plurality of pre-stored touch chords according to combinations of M1 and M2.

15. The method of claim 13, when M1=1 and M2=1, the specific touch chord is defined single-point touch chord.

16. The method of claim 13, wherein when M1=2 and M2=2, the specific touch chord is defined first dual-point touch chord; when M1=1 and M2=2, the specific touch chord is defined second dual-point touch chord; when M1=2 and M2=1, the specific touch chord is defined third dual-point touch chord.

17. The method of claim 13, wherein when M1>2 or M2>2, the specific touch chord is defined multi-point touch chord.

18. The method of claim 13, wherein the specific moving mode is related to a movement of the M1 first observation points and the M2 second observation points.

19. The method of claim 13, wherein the specific moving mode is related to a movement of a first center position of the M1 first observation points and a second center position of the M2 second observation points following the touch gesture, the first center position is a position average value of the M1 first observation points and the second center position is a position average value of the M2 second observation points.

20. The method of claim 12, wherein the specific action is selected from one of the group of: zoom-in, zoom-out, upward scrolling, downward scrolling, left scrolling, right scrolling, previous page, next page, previous label, and next label.

* * * * *